(12) United States Patent
Vallat et al.

(10) Patent No.: US 9,355,409 B2
(45) Date of Patent: May 31, 2016

(54) INTELLIGENT COMMUNICATION AND ADVERTISING MECHANISM

(71) Applicant: Tata Consultancy Services Limited, Maharashtra (IN)

(72) Inventors: Sathish Vallat, Karnataka (IN); Shalin Garg, Karnataka (IN); Vibhor Goswami, Karnataka (IN)

(73) Assignee: Tata Consultancy Services Limited, Maharashtra (IN)

( * ) Notice: Subject to any disclaimer, the term of this patent is extended or adjusted under 35 U.S.C. 154(b) by 324 days.

(21) Appl. No.: 14/179,677

(22) Filed: Feb. 13, 2014

(65) Prior Publication Data
US 2014/0344063 A1    Nov. 20, 2014

(30) Foreign Application Priority Data
May 16, 2013    (IN) .......................... 1757/MUM/2013

(51) Int. Cl.
| | | |
|---|---|---|
| *H04M 3/42* | (2006.01) | |
| *G06Q 30/02* | (2012.01) | |
| *H04W 4/04* | (2009.01) | |
| *H04W 12/06* | (2009.01) | |
| *H04W 4/20* | (2009.01) | |
| *H04W 4/06* | (2009.01) | |

(52) U.S. Cl.
CPC ........... *G06Q 30/0267* (2013.01); *H04W 4/046* (2013.01); *H04W 4/06* (2013.01); *H04W 4/206* (2013.01); *H04W 12/06* (2013.01)

(58) Field of Classification Search
CPC ............................. H04W 12/08; G06Q 20/32
USPC ............... 455/456.3, 456.1, 419, 41.2, 456.2, 455/515, 412.1, 456.6; 705/7.32, 14.58, 705/333, 14.45, 14.64; 340/870.07; 370/255, 328
See application file for complete search history.

(56) References Cited

U.S. PATENT DOCUMENTS

| | | |
|---|---|---|
| 6,993,326 B2 | 1/2006 | Link, II et al. |
| 7,103,368 B2 | 9/2006 | Teshima |

(Continued)

OTHER PUBLICATIONS

Department of Computer Science University Politehnica of Bucharest, "Mobile Advertisement in Vehicular Ad-Hoc Networks" © Eurosis-ETI.

(Continued)

*Primary Examiner* — Kiet Doan
(74) *Attorney, Agent, or Firm* — Hayes Soloway PC (57) ABSTRACT

Disclosed is a system and method for exchanging information between a mobile device and a physical advertising medium, such as a billboard. The method and system enables a pluggable device, coupled with the mobile device, to detect the mobile device within its vicinity of the physical advertising medium. On detection of the mobile device, the pluggable device establishes a handshake communication channel with the mobile device by authorizing the mobile device. Upon authorizing the mobile device, the pluggable device initiates the advertisement information exchange between the physical advertising medium and the mobile device in a non-intrusive manner. In one aspect, the method and system further enables the mobile device to relay the advertisement information to other mobile devices or any other physical advertisement mediums within its vicinity.

17 Claims, 5 Drawing Sheets

(56) References Cited

U.S. PATENT DOCUMENTS

| | | |
|---|---|---|
| 8,254,338 B2 | 8/2012 | Anschutz et al. |
| 8,538,458 B2 | 9/2013 | Haney |
| 2002/0087401 A1 | 7/2002 | Leapman et al. |
| 2008/0208701 A1* | 8/2008 | Betancourt ............ G06Q 10/02 705/5 |
| 2013/0290095 A1* | 10/2013 | Crinon ............... G06Q 30/0246 705/14.45 |
| 2014/0187267 A1* | 7/2014 | Yang ...................... H04L 69/14 455/456.3 |
| 2015/0302480 A1* | 10/2015 | Smereka ............... H04W 4/021 705/14.58 |

OTHER PUBLICATIONS

School of Computing & Communications Pedro Ventura, Hugo Sousa, Joaquim Jorge, "Mobile Phone Interaction with Outdoor Advertisements".

Interactive billboards that talk to your phone—Welcome to marketing 2.0 (video), Aug. 2, 2011.

Portlogic Systems Inc., "Mobile Coupon and Ad Delivery" Proximity Mobile Marketing.

\* cited by examiner

INTELLIGENT COMMUNICATION AND ADVERTISING MECHANISM

FIELD OF THE INVENTION

The present disclosure relates to a field of wireless communication. More particularly, it relates to a system and method for exchanging information between a broadcasting device and a smart communication device in a non-intrusive manner.

BACKGROUND OF THE INVENTION

At present, the traditional way of advertising or publishing advertisement in an outdoor environment, typically known as out-of-home advertisement, is by means of a physical advertising medium such as billboard or a signage or a hoarding generally placed at the top of designated market areas. The physical advertising medium may be a large outdoor advertising structure, typically found in high traffic areas such as alongside busy roads. Further the physical advertising medium renders large advertisements to the passing pedestrians and drivers located primarily on major highways, expressways or high population density market place.

In one scenario, the physical advertising medium acts as either basic display units or static display units that showcase preloaded advertisements such as shop hoardings, sale signs, glass display boards, displaying static information or preloaded advertisements. These are conceptualized for human consumption (via human vision) and are limited by display area/space available. In such a scenario, the physical advertising medium (billboards, signage or display boards) are generally placed outdoors which are mostly missed by people while commuting or roaming in the high population density market place. Further at times it also becomes a means of distraction for the drivers or commuters while driving the vehicle at a high speed on a highway or within a city. In another scenario, the physical advertising medium act as dynamic display units which are communicatively connected with a server for dynamically displaying the information stored on the server. In such scenario, it brings out the dependency on network connectivity for dynamically updating the information to be displayed on the physical advertising medium as some times the physical advertising medium may be intermittently or not continuously connected with the server due to network congestion or network failure. In another scenario, the physical advertising medium is located at a location where network connectivity is not present, and the need to make it dynamic rather than static with manual updates.

It has been further observed that many promoters tend to spend a large investment amount on promoting their businesses through billboards or signage or business establishments that are placed in the most happening places of the city which are in close proximity to attract customer attention. These methods may provide certain rate of success but are expensive and time consuming. Even after spending such a large investment amount, there is a high chance that the published information on advertisements is being overlooked by the people passing by these physical advertising mediums. Most of the people or commuters, while utilizing public transports (bus, train etc.), may not even notice the advertisements published on the billboard/signage located at different locations due to closed vehicles as the vehicles are having limited window area. Due to these limitations, advertisers' establishments are at enormous loss as they have to keep investing on the physical advertising mediums to promote or advertise their products or services by making bigger, flashier, attention grabbing billboards/signage and place them at plurality of different places to attract potential users or people as most of them either do not pay attention or may just miss seeing the billboards, signage or display boards while passing through their vicinity.

With the consistent technical advancement in the field of telecommunication and wireless communication, the advertisements and other information has started reaching the users carrying a mobile communication device via pop-up ads on browsers and installed applications or via user initiated actions like Bluetooth ad messages or QR code scanning. Now-a-days, various users of the mobile communication devices have been targeted for receiving advertisement information sent by an establishment using wireless communication means. In order to receive such information, the user manually initiates the communication for receiving the information from the corresponding establishment.

The manual establishment of communication with the physical advertising medium may not be beneficial. For example, till the time the user initiates the communication with the physical advertising medium, the physical advertising medium may not be within the range of the user and hence the information displayed on the physical advertising medium may not be rendered on the user's device, though the user was interested in consuming said information. This is because; the user may be driving vehicle at speed, and hence is unable to capture the information displayed. Further, the present art lacks in broadcasting the information to other devices through a single device in the range of the physical advertising medium. Additionally, there is no provision in the art that enables the user to communicate with the multiple physical advertising mediums deployed in same location.

Thus, in view of the lacunae observed in the art, a long-felt and unaddressed need exists in the industry to address the aforementioned deficiencies and inadequacies.

OBJECTS OF THE INVENTION

The primary object of a present disclosure is to enable a system and method for dynamically synchronizing information to be published on a plurality of broadcasting/pluggable devices with the information stored on a server with intermittent/no network connectivity.

Yet another object of a present disclosure is to enable a system and method for detecting at least one smart communication device within the vicinity of the broadcasting/pluggable device.

Yet another object of a present disclosure is to enable a system and method for establishing a communication channel between the detected device and the broadcasting/pluggable device in a very short span of time.

Yet another object of the disclosure is to provide a system and method for transmitting the information from the broadcasting/pluggable device over the established communication channel to the smart communication device in a non-intrusive manner.

Yet another object of the disclosure is to provide a system and method for transmitting and relaying the information through one or more intermediate smart communication devices from the smart communication device to one or more broadcasting/pluggable device connected intermittently with the server.

Still another object of the disclosure is to provide a system and method for synchronizing the previously stored information in the one or more broadcasting/pluggable devices with the information relayed through the one or more intermediate smart communication devices.

Still another object of the disclosure is to provide a system and method for enabling one or more smart communication devices utilize relayed relevant information of a product or list of products from the one or more broadcasting/pluggable devices for banking, analytics, preference based search, payments, transactions etc.

SUMMARY OF THE INVENTION

Before the present systems and methods, enablement are described, it is to be understood that this application is not limited to the particular systems and methodologies described, as there can be multiple possible embodiments which are not expressly illustrated in the present disclosures. It is also to be understood that the terminology used in the description is for the purpose of describing the particular versions or embodiments only and is not intended to limit the scope of the present application.

Embodiments of the present disclosure provide a system and method for dynamically synchronizing information to be published on a plurality of broadcasting devices with the information stored on a server in an intermittent network connectivity by relaying the information through one or more intermediate smart communication devices in a non-intrusive manner. In this regard, one embodiment of such a method, among others, can be broadly summarized by the following steps: detecting, by a first processor, at least one smart communication device from a first set of smart communication devices within a vicinity of at least one broadcasting device from a first set of broadcasting devices; establishing, by the first processor, a handshake communication channel between the at least one smart communication device and the at least one broadcasting device, wherein the at least one smart communication device is authorized using at least one of an authentication technique, an authorization technique, and a cryptographic technique before establishing the handshake communication channel; receiving, by a second processor, a quantity of information to be published on the at least one broadcasting device from the smart communication device through the established handshake communication channel; relaying, by the second processor, at least a portion of the quantity of information received from the smart communication device to at least one smart communication device from a second set of smart communication devices; establishing, by the second processor, the handshake communication channel between the at least one smart communication device from the first set of communication devices and at least one broadcasting device from a second set of broadcasting devices; and synchronizing, by the second processor, the quantity of information to be published by the at least one broadcasting device from the second set of broadcasting devices with at least a portion of the quantity of the information received by the at least one smart communication device from the first set of communication devices and the quantity of information relayed to the at least one smart communication device from the second set of smart communication devices.

The present disclosure can also be viewed as providing a system for dynamically synchronizing information to be published on a plurality of broadcasting devices with the information stored on a server in an intermittent network connectivity. Briefly described, in architecture, one embodiment of the system, among others, can be implemented as follows. The system comprises at least one pluggable device in at least one of the plurality of broadcasting devices. The at least one pluggable device comprises a first processor and a first memory coupled with the first processor. The first memory comprises a plurality of modules, wherein the plurality of modules comprises: a detection module configured to detect a presence of at least one smart communication device within a vicinity of the at least on pluggable device; a transceiver module configured to establish a handshake communication channel with the at least one smart communication device; an authorization module configured to authorize the at least one smart communication device and secure the handshake communication channel; a database module configured to store a quantity of information received from at least one of: the at least one smart communication device and the server; and a congestion control module configured to control congestion traffic due to instantaneous information exchange with a plurality of smart communication devices. The at least one smart communication device further comprises a second processor and a second memory coupled with the second processor. The second memory comprises a plurality of modules, wherein the plurality of modules comprises: a display module configured to display the information to be published by the plurality of broadcasting devices; a database module configured to store the quantity information received from the plurality of broadcasting devices; an authorization module for authorizing at least one additional smart communication device from at least one of a first and a second set of smart communication devices; a transceiver module adapted to transmit and receive the quantity of information to and from the plurality of broadcasting devices and the at least one additional smart communication device; and a synchronization module configured to synchronize the quantity of information to be published on the plurality of broadcasting devices.

The present disclosure can also be viewed as providing methods for synchronizing a plurality of broadcasting devices with a smart communication device during intermittent network connectivity between the plurality of broadcasting devices and a server. In this regard, one embodiment of such a method, among others, can be broadly summarized by the following steps: detecting at least one smart communication device located within a vicinity of a first broadcasting device of the plurality of broadcasting devices; establishing a first handshake communication channel between a processor of the at least one smart communication device and a processor of the first broadcasting device, wherein the first handshake communication channel is established using at least one of an authentication technique, an authorization technique, and a cryptographic technique; receiving, on the at least one smart communication device, a quantity of information from the first broadcasting device through the first handshake communication channel; terminating the first handshake communication channel when the at least one smart communication device is located beyond a vicinity of the first broadcasting device, wherein the quantity of information from the first broadcasting device is stored on a memory of the at least one smart communication device; detecting the at least one smart communication device located within a vicinity of a second broadcasting device of the plurality of broadcasting devices; establishing a second handshake communication channel between the at least one smart communication device and the second broadcasting device, wherein the second handshake communication channel is established using at least one of the authentication technique, the authorization technique, and the cryptographic technique; and synchronizing at least a portion of the quantity of information received from the first broadcasting device with the second broadcasting device through the second handshake communication channel, wherein the quantity of information is stored in the memory of the at least one smart communication device.

BRIEF DESCRIPTION OF DRAWINGS

The foregoing description, as well as the following detailed description of embodiments, is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION OF THE INVENTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

It will be readily understood that the components of the present disclosure, as generally described and illustrated in the Figures herein, could be arranged and designed in a wide variety of different configurations. Thus, the following more detailed description of the embodiments of the disclosure, as represented in the figures and flowcharts, is not intended to limit the scope of the disclosure, as claimed, but is merely representative of certain examples of presently contemplated embodiments in accordance with the disclosure.

The presently described embodiments will be best understood by reference to the drawings, wherein like parts are designated by like numerals throughout. Moreover, flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises of one or more executable instructions for implementing the specified logical function(s).

Various modifications to the embodiment will be readily apparent to those skilled in the art and the generic principles herein may be applied to other embodiments. For example, although the present disclosure will be described in the context of a system and method dynamically synchronizing information to be published on a plurality of broadcasting devices with the information stored on a server in intermittent network connectivity, one of ordinary skill in the art will readily recognize that the system and method can be utilized in any situation where there is a need to synchronize the information stored on the server with the smart communication device which are detected within the vicinity of the broadcasting device or with the broadcasting device located at the remote location having intermittent/no network connectivity. Thus, the present disclosure is not intended to be limited to the embodiments illustrated, but is to be accorded the widest scope consistent with the principles and features described herein. Various embodiments of the present disclosure will now be described with the help of appended figures.

The present disclosure discloses a system and method for dynamically synchronizing information to be published on at least one broadcasting device from a first and a second set of broadcasting devices with the information stored on a server. In an embodiment, the first set of broadcasting devices are communicatively coupled in a continuous manner with the server while the second set of broadcasting devices are intermittently connected with the server. The server is configured for periodically updating the information to be published and therefore synchronizes the updated information on the first set of broadcasting devices, which is further updated in the second set of broadcasting devices using the first set of broadcasting devices in association with at least one smart communication device from a first or a second set of smart communication devices detected within the vicinity of the first and second set of broadcasting devices.

In one embodiment, the present disclosure enables synchronization of the information to be published by establishing an instantaneous communication channel to transmit the information in a very short span of time. Each of the first and second set of broadcasting devices comprises of a pluggable device, wherein the pluggable device may be electronically or physically coupled with the broadcasting device. The pluggable device is configured to establish the communication channel between the smart communication devices within its vicinity. In an embodiment, the pluggable device in at least one broadcasting device from the first set of broadcasting devices is adapted to detect at least one smart communication device from the first set of smart communication devices within its vicinity. The pluggable device is then adapted to establish a handshake communication channel with the at least one smart communication device to transmit (in some cases exchange) the information by confirming the authorization of the smart communication device using at least one cryptographic technique. It may be understood that, the handshake communication channel may include an automated process of negotiation between the devices that dynamically sets parameters of a communications channel established between two devices before normal communication over the channel begins.

In one embodiment, the at least one smart communication device, following authorization, receives the information which gets stored in a database module of the smart communication device for future references. As soon as the at least one smart communication device enters within the vicinity of at least one broadcasting device selected from the second set of broadcasting devices, the previously stored information in the at least one broadcasting device from the second set of broadcasting devices is synchronized with the information received by the at least one smart communication device in a non-intrusive manner. In another embodiment, the at least one smart communication device from the first set of smart communication devices relays the information received to at least one other smart communication device selected from a second set of smart communication devices in a non-intrusive manner using the handshake communication channel. The relayed information further enables the synchronization of the information to be published by the at least one broadcasting device from the second set of broadcasting devices.

In one embodiment, before synchronizing the information, the smart communication device selected either from the first or the second set of smart communication devices smartly verifies whether the information stored earlier on the at least one broadcasting device is synchronized. If the information is not synchronized, the at least one smart communication device synchronizes the information with the broadcasting device with the second set of broadcasting devices. In one embodiment, each of the smart communication devices from the first and the second set of smart communication devices are authorized using the at least one cryptographic technique comprising public-key cryptography or transparent encryption or symmetric encryption or combinations thereof.

In an exemplary embodiment of the disclosure, the authorization is performed by public-key encryption technique, wherein the pluggable device is coupled with the at least one broadcasting device and the at least one smart communication device holds two types of keys, a public key and a private key. The private key is confidential and should not be shared, whereas the public key is allowed to be shared with the other party. The information is encrypted using the public key whereas the information is decrypted using the private key. In one embodiment, the broadcasting device encrypts the information to be shared using a private key whereas the smart communication device decrypts the information using a public key. Further if the smart communication device is transmitting the information to the broadcasting device, the smart communication device encrypts the information using the public key and the broadcasting device needs to decrypt the information using its private key. The appropriate public and the private keys are either pre-loaded on the devices or updated by the server based on the network/provider policies. In one embodiment, the at least one smart communication device is authorized using at least one authentication, authorization technique such as secret passphrase, PIN, password, challenge-response or the like.

In one embodiment of the disclosure, if the smart communication device from the first or the second set of smart communication devices is detected within the vicinity of one or more broadcasting devices from the first or the second set of broadcasting devices, then the smart communication device is enabled to communicate with the one or more broadcasting devices in parallel. Further, in another embodiment, there may be various sensors deployed on the broadcasting device that enables to derive information about various parameters including temperature, atmospheric pressure, pollution level, and natural calamities such as earthquake, flood etc. The information derived from these sensors may be passed on to the pluggable device physically/communicatively attached with the broadcasting device. Further, the information derived may be passed to the smart communication device through the pluggable device when said smart communication device is in the vicinity of said pluggable device.

It will be understood that each block of the flowchart illustrations and/or block diagrams, and combinations of blocks in the flowchart illustrations and/or block diagrams, can be implemented by programmed instructions or code. These programmed instructions may be provided to a processor included in the at least one pluggable device and/or the at least one smart communication device, or other programmable data processing apparatus to produce a machine, such that the instructions, which when executed via the processor of the at least one pluggable device and/or the at least one smart communication device or the other programmable data processing apparatus, create means for implementing the functions/acts specified in the flowchart and/or block diagram block or blocks.

Figure 1:
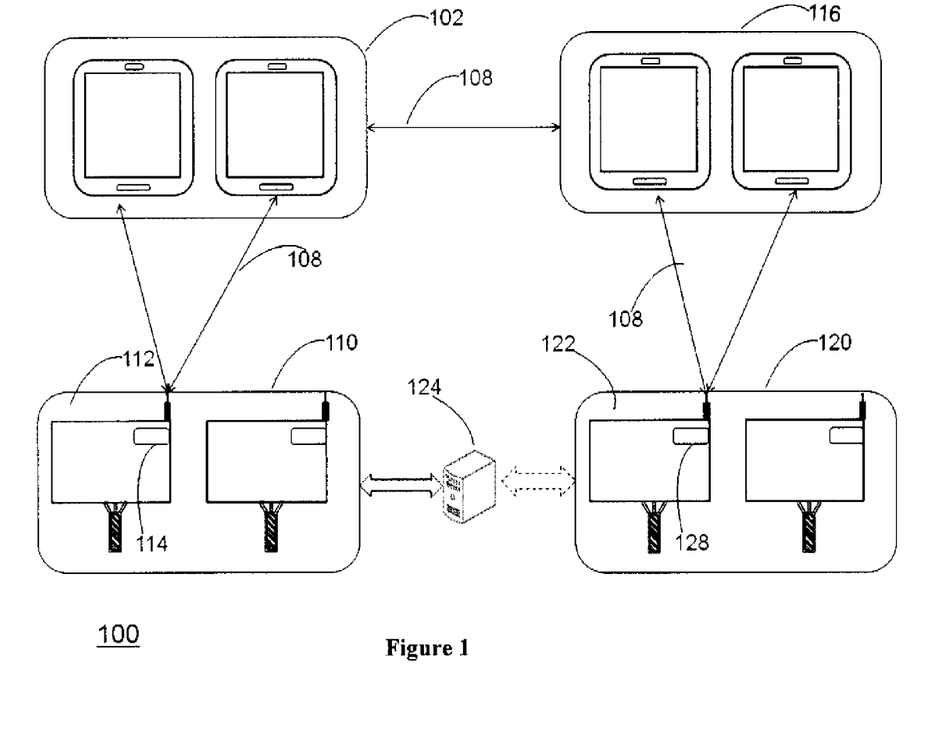
FIG. 1 is an architecture diagram (100) illustrating various system components, according to an embodiment of the present disclosure.

FIG. 1 is an architecture diagram (100) illustrating various system components, according to an embodiment of the present disclosure. The system comprises of a first set of broadcasting devices (110), a second set of broadcasting devices (120), a pluggable device (114) coupled with each of the broadcasting device in the first set of broadcasting devices (110), a pluggable device (128) coupled with each of the broadcasting device in the second (120) set of the broadcasting devices, a server (124), a first set of smart communication devices (102), a second set of smart communication devices (116) and a handshake communication channel (108).

In an embodiment, the first set of broadcasting devices (110) and the second set of broadcasting devices (120) can be selected from a group comprising of a static advertisement medium, a dynamic advertisement medium, television receiver, an Out-of-home (OOH) advertising platform, a signage, a display device of a business establishment unit or any other broadcasting unit capable of broadcasting mass media information. The first set of broadcasting devices (110) and the second set of broadcasting devices (120) are communicatively coupled with the server (124). The server (124) stores the information that is to be published on the first set of broadcasting devices (110) and the second set of broadcasting devices (120). The information is frequently updated by the server (124) at a pre-defined time interval. As a result of this, the information published on the first set of broadcasting devices (110) and the second set of broadcasting devices (120) needs to be synchronized with the updated information on the server (124).

In one embodiment, the first set of broadcasting devices (110) are communicatively coupled with the server (124) in a continuous manner, and hence the information published on these are dynamically updated with the information updated on the server (124). In one embodiment, the second set of broadcasting devices (120) may be intermittently connected with the server (124) as the network is not constantly available, and hence the information published on the second set of broadcasting devices (120) may not be synchronized with the updated information on the server (124).

The present disclosure enables to utilize the updated information on the first set of broadcasting devices (110) to synchronize the information published on the second set of broadcasting devices (120). This is achieved by relaying the information published on the first set of broadcasting devices (110) through at least one smart communication device from the first set of smart communication devices (102) and the second set of smart communication devices (116). In an embodiment, the first (102) and the second (116) set of smart communication devices can be at least one selected from a group comprising a smart mobile phone, a personal digital assistant (PDA), a Head-up display (HUD) unit, an in-car infotainment system, a Google glass project.

In one embodiment of the disclosure, the at least one smart communication from the first set of smart communication devices (102) is detected by the pluggable device (114) coupled with the at least one broadcasting device (112) from the first set of broadcasting devices (110). The pluggable device (114) is an autonomous, remote-controlled or remotely-programmed, electronic device that can be reprogrammed or controlled by the server (124) to broadcast dynamic information on the at least one broadcasting device (112). In one embodiment, the pluggable device (114) is communicatively coupled or can be placed near the at least one broadcasting device (112).

In an exemplary embodiment, the pluggable device (114) is adapted to authorize the at least one smart communication device from the first set of smart communication devices (102) by using at least one cryptographic or authentication/authorization technique. The pluggable device (114) is further adapted to establish the handshake communication channel (108) with the at least one smart communication device from the first set of smart communication devices (102) to transmit the information.

In an embodiment, the at least one smart communication device from the first set of smart communication devices (102), carrying the information, is configured to detect at least one smart communication device from the second set of smart communication devices (116) within its vicinity. The at least one smart communication device from the first set of smart communication devices (102) is adapted to authorize the at least one smart communication device from the second set of smart communication devices (116). The at least one smart communication device from the first set of smart communication devices (102) then establishes the handshake communication channel (108) with the at least one smart communication device from the second set of smart communication devices (116). The dynamic information is then relayed through the established handshake communication channel (108) to the at least one smart communication device from the second set of smart communication devices (116).

In an embodiment, the at least one smart communication device from the second set of smart communication devices (116) carrying the relayed information is then adapted to establish the handshake communication channel (108) with at least one broadcasting device (122) from the second set of broadcasting devices (120). The at least one smart communication device from the second set of smart communication devices (116) transmits the relayed information to the at least one broadcasting device (122). The previously stored information in the at least one broadcasting device (122) is updated with the relayed information and hence synchronization of the information is achieved.

Figure 2:
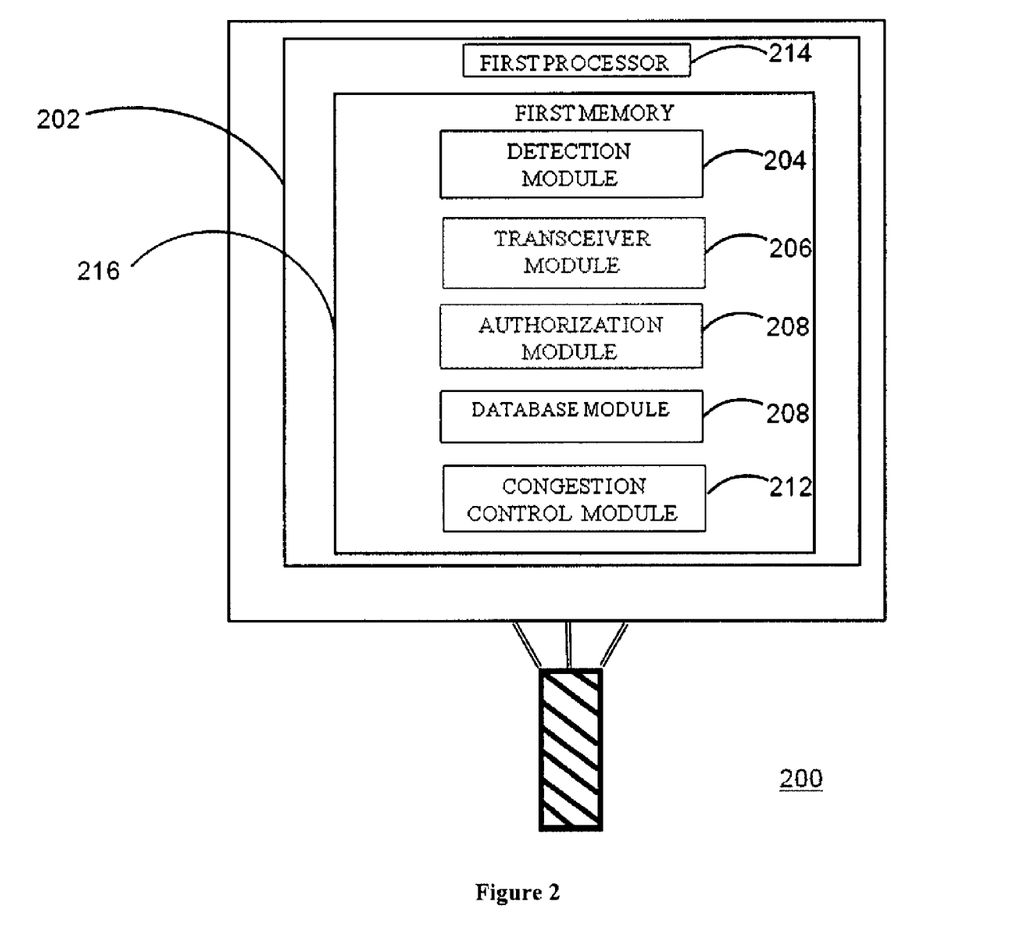
FIG. 2 is an architecture diagram (200) illustrating various modules embedded in a smart communication device according to an embodiment of the disclosure.

FIG. 2 illustrates various modules embedded in a broadcasting device (200) according to an embodiment of the disclosure. The broadcasting device (200) comprises of a pluggable device (202) communicatively coupled with the broadcasting device (200). The pluggable device (202) further comprises a first processor (214) and a first memory (216), wherein the first memory (216) is coupled to the first processor (214). The first memory (216) further comprises a plurality of modules such as a detection module (204), a transceiver module (206), an authorization module (208), a database module (210) and a congestion control module (212). In one embodiment, the detection module (204) is configured to detect the presence of at least one smart communication device within its vicinity. After detecting the at least one smart communication device, the pluggable device (202) further enables the transceiver module (206) to establish a handshake communication channel with the at least one smart communication device. Upon establishing the handshake communication channel, the authorization module (208) is further configured to authorize the at least one smart communication device using at least one cryptographic technique such as public-key cryptography or transparent encryption or symmetric encryption or the like. Further, in another embodiment, the authorization module (208) is further configured to authorize the at least one smart communication device using at least one authentication or authorization technique selected from a group comprising secret passphrase, PIN, password, challenge-response or combinations thereof. Upon authorizing the at least one smart communication device, the database module (210) is further configured to store the information received either from the server (124 of FIG. 1) or from the smart communication device. In one embodiment, the congestion control module (212) is configured to control the congestion traffic due to instantaneous information exchange with a plurality of smart communication devices and a plurality of broadcasting devices. The congestion control module (212) is further enabled to maintain the robustness and integrity of the communication and all the users present in the vicinity of the broadcasting device (200). In one embodiment of the disclosure, the broadcasting device (200) may be installed at a remote location with no network connectivity as well as no power availability. In such cases, the broadcasting device (200) is adapted to draw power from non-conventional source of energy including solar, wind, tidal, geo-thermal, biomass or combinations thereof. In one embodiment, the pluggable device (202) would exchange information with the server (124 of FIG. 1) using the smart communication devices as the communication channel, as explained earlier under [042] and [043].

Figure 3:
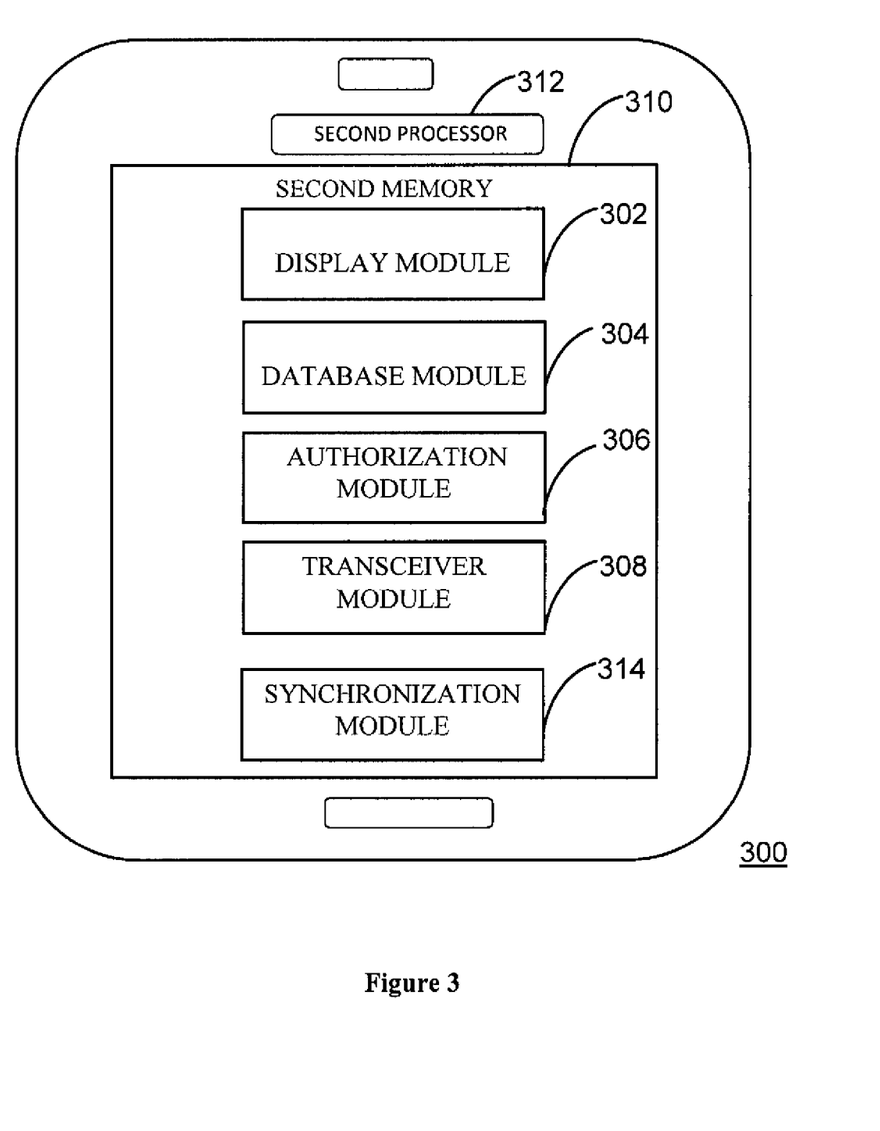
FIG. 3 is an architecture diagram (300) illustrating various modules embedded in a broadcasting device according to an embodiment of the disclosure.

FIG. 3 illustrates various modules embedded in a smart communication device (300) according to an embodiment of the disclosure. It is to be understood that the smart communication device (300) illustrated in FIG. 3 can be considered to be at least one smart communication device selected from the first set of smart communication devices (102) or from the second set of smart communication devices (116), as illustrated in FIG. 1. The smart communication device (300) comprises a second processor (312) and a second memory (310), wherein the second memory (310) is coupled to the second processor (312). The second memory (310) further comprises a plurality of modules such as a display module (302), a database module (304), an authorization module (306), a transceiver module (308) and a synchronization module. According to exemplary embodiment, when the smart communication device (300) is detected by at least one pluggable device (not shown in the figure) coupled with at least one broadcasting device (not shown in the figure), the at least one pluggable device transmits the information to the smart communication device (300) through a handshake communication channel. The display module (302) is configured to display the information received from the broadcasting device to the user. The database module (304) is further adapted to store the information received for future reference of the user. In one embodiment, before transmitting the information, the at least one smart communication device (300) is authorized. Further the method for authorizing the smart communication device (300) is performed by the authorization module (306) using at least one cryptographic technique such as public-key cryptography or transparent encryption or symmetric encryption or at least one authentication, authorization technique such as secret passphrase, PIN, password, challenge-response. After authorizing the smart communication device (300), the transceiver module (308) is further adapted for transmitting and receiving the information to and from the at least one broadcasting device. The second processor (312) is further adapted to control the display module (302), the database module (304), the authorization module (306) and the transceiver module (308) are configured to perform one or more intended functions/tasks/methodologies as disclosed above. The synchronization module (314) is configured to synchronize the information to be published on the plurality of broadcasting devices. In one embodiment, the received information can be utilized for enabling the second processor (312) to perform analytics, in-depth search based on user preferences, monetary transactions, etc. The second processor (312) is also configured to analyze the user demographic profile to selectively filter the information relevant with the user's demographic profile and discarding the irrelevant information received from the plurality of broadcasting devices. This helps in avoiding overloading of second memory space with irrelevant information in the database module (304).

It will be readily understood that, a pluggable device, at least one broadcasting device and a handshake communication channel illustrated in FIG. 2 and FIG. 3 are similar to the pluggable device (114, 128), the broadcasting device (112, 122) and the handshake communication channel (108) as illustrated in FIG. 1.

Figure 4:
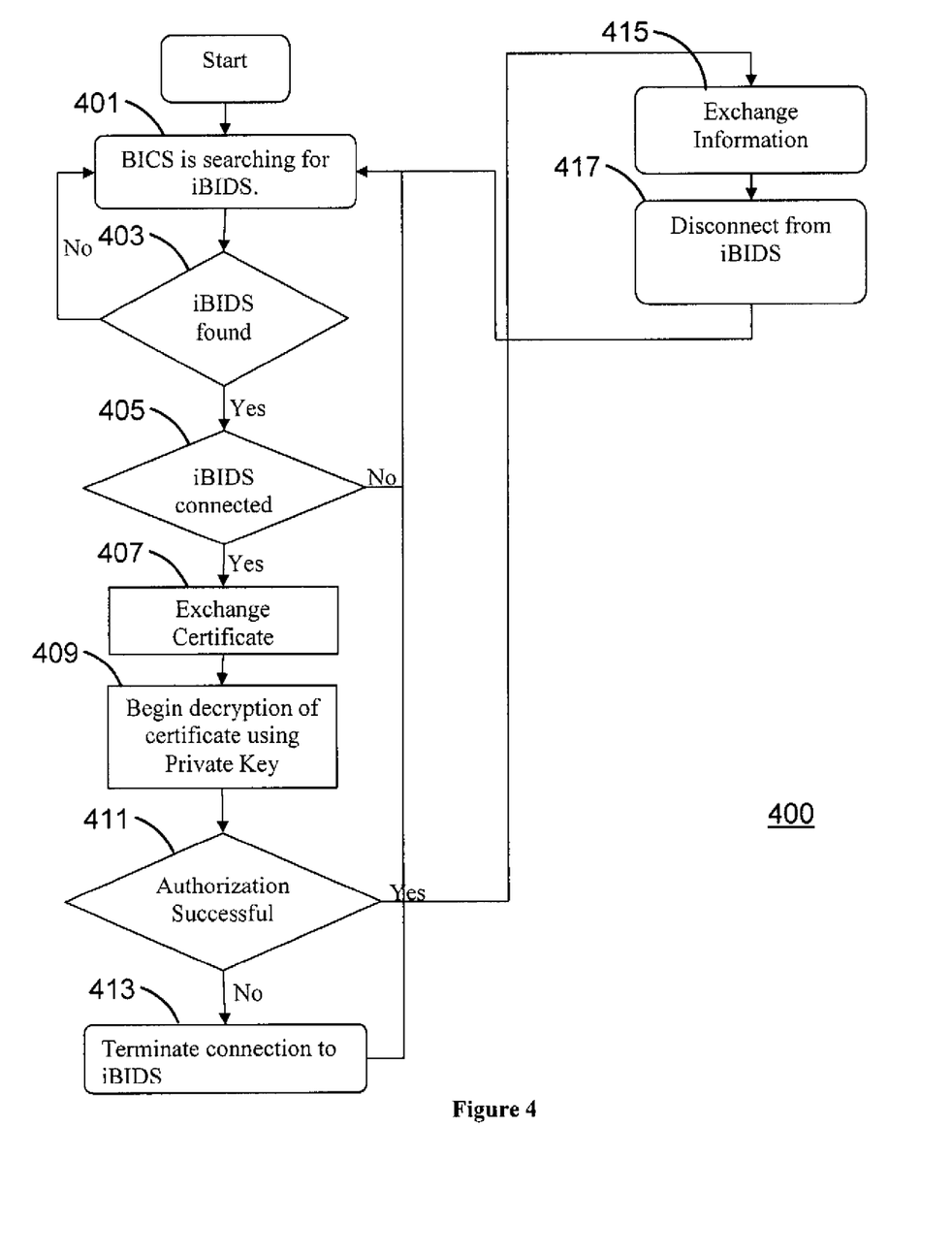
FIG. 4 illustrate a flow diagram (400) showing various steps involved in the communication between the broadcasting device and the smart communication device according to an embodiment of the disclosure.

FIG. 4 illustrates a flow diagram (400) showing various steps implemented by the system (400) according to exemplary embodiment of the disclosure. In this particular embodiment, the at least one broadcasting device and the at least one smart communication device as shown in FIG. 1 are referred as Billboard Information Communication System (BICS) and Smart Billboard Information Display System (iBIDS) respectively. The BICS is an autonomous, remote-controlled or remotely-programmed, electronic device that can be placed near a billboard/business establishment which establishes a handshake communication channel and initiates the information exchange with the iBIDS. Alternatively to BICS, the iBIDS is a smart communication device that is carried by the customer or is present with the customer which is capable of working independently to communicate with the BICS. In one embodiment, the BICS and the iBIDS are provided with their own set of keys, wherein the set of keys comprises a public key and a private key for encrypting or decrypting at least one certificate that is to be shared between the iBIDS and BICS for authorization in order to enable exchange of the information.

Referring to FIG. 4, at step (401), the BICS is in searching mode to detect the at least one iBIDS within its vicinity. At steps (403) and (405), when the iBIDS is found, the BICS is connected with the detected iBIDS, or the BICS continuously searches for the iBIDS, until the iBIDS is detected within its vicinity. As the iBIDS appears within the vicinity of the BICS, a connection request is initiated from the BICS to the iBIDS for establishing the handshake communication channel. The iBIDS is capable of accepting this connection request non-intrusively. When the handshake communication channel is established between the BICS and the iBIDS, at step (407), the iBIDS is adapted to transmit at least one authorization certificate to the BICS for authorization of the iBIDS with the BICS. At step (409), the BICS is adapted to decrypt the authorization certificate using its private key. At step (411), when the authorization is successful, the exchange of information takes place between the BICS and the iBIDS at step (415). At step (417), after the exchange of information, the BICS gets disconnected from the iBIDS. At step (411), when the authorization is not successful, the BICS terminates the handshake communication channel with the iBIDS at step (413).

Figure 5:
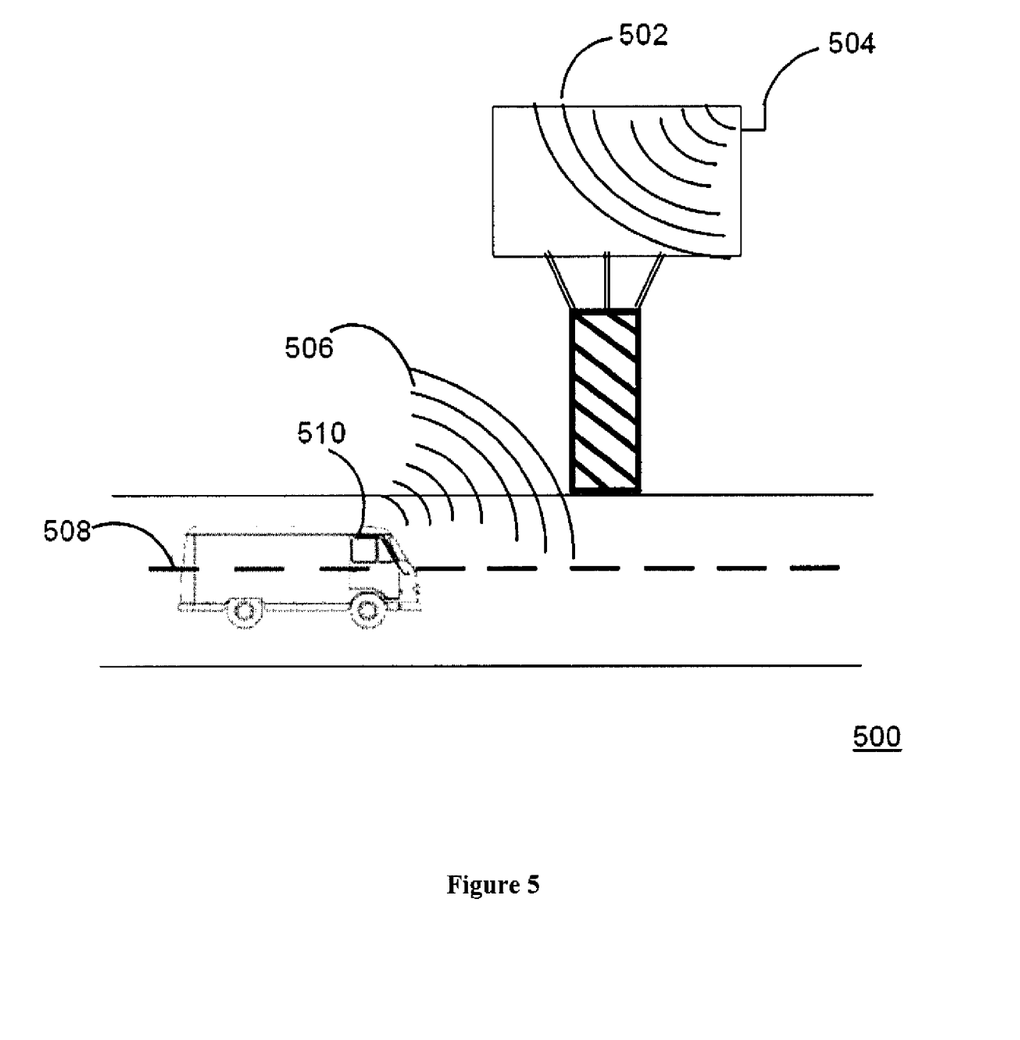
FIG. 5 is a working example illustrating the communication between a car infotainment system and a billboard while passing through the billboard.

FIG. 5 is a working example illustrating the communication between a car infotainment system (510) integrated within a vehicle (508) and a billboard (502) while passing through the billboard (502). In this particular embodiment, the car infotainment system (510) refers to 'iBIDS' and the billboard refer to 'BICS' which exchanges the information through a handshake communication channel (506). In an exemplary embodiment of the disclosure, a pluggable device (504) is communicatively and/or physically coupled with the billboard (502). The pluggable device (504) detects the car infotainment system (510), when the vehicle (508) moving on a highway at a very high speed appears within the vicinity of the pluggable device (504). The pluggable device (504) is further enabled to establish the handshake communication channel (506) with the car infotainment system (510) to transmit the information. The car infotainment system (510) is then adapted to receive the transmitted information which gets stored for future reference. As the vehicle (508) moves out of the vicinity of the pluggable device (504), the established communication channel (506) gets disconnected from the car infotainment system (510).

In one embodiment, the car infotainment system (510) further carries the information to different location and synchronizes the information of another billboard which is remotely located and hence intermittently connected with the server. In another embodiment, the car infotainment system (510) can relay the information to other 'iBIDS' (not shown in the figure) in the vicinity capable of carrying the information, which then synchronizes the information of the billboard remotely located (not shown in the figure) in no network connectivity area and intermittently connected with the server.

ADVANTAGES OF THE INVENTION

The present disclosure provides a means for communication between a broadcasting device or billboard and a person/user carrying a smart communication device for exchanging information between them.

The present disclosure further reduces the communication barrier and also enhances the capability of the OOH advertising platform or billboard to be noticed, stored/saved in the memory of the smart communication device and analyzed at a later point.

The present disclosure is further enabled to transmit the information published on the OOH advertising platform to the smart communication device over a wireless communication channel in a non-intrusive manner.

The present disclosure is further enabled to transmit such information to the person or user carrying the smart communication device in a very short span of time (to cater people moving at high speeds such as highways).

The present disclosure is further enabled to transmit the information based on the user's demographic profile or user preferences and further discard all the information received from the broadcasting device in order to release the memory space of the smart communication device.

The illustrations of arrangements described herein are intended to provide a general understanding of the structure of various embodiments, and they are not intended to serve as a complete description of all the elements and features of systems that might make use of the structures described herein. Many other arrangements will be apparent to those of skill in the art upon reviewing the above description. Other arrangements may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although the disclosure has been described in terms of specific embodiments and applications, persons skilled in the art can, in light of this teaching, generate additional embodiments without exceeding the scope or departing from the spirit of the disclosure described herein.

We claim:

1. A method for dynamically synchronizing information to be published on a plurality of broadcasting devices with the information stored on a server in an intermittent network connectivity by relaying the information through one or more intermediate smart communication devices in a non-intrusive manner, the method comprising:
   detecting, by a first processor, at least one smart communication device from a first set of smart communication devices within a vicinity of at least one broadcasting device from a first set of broadcasting devices;
   establishing, by the first processor, a handshake communication channel between the at least one smart communication device and the at least one broadcasting device, wherein the at least one smart communication device is authorized using at least one of an authentication technique, an authorization technique, and a cryptographic technique before establishing the handshake communication channel;
   receiving, by a second processor, a quantity of information to be published on the at least one broadcasting device from the smart communication device through the established handshake communication channel;
   relaying, by the second processor, at least a portion of the quantity of information received from the smart communication device to at least one smart communication device from a second set of smart communication devices;
   establishing, by the second processor, the handshake communication channel between the at least one smart communication device from the first set of communication devices and at least one broadcasting device from a second set of broadcasting devices; and
   synchronizing, by the second processor, the quantity of information to be published by the at least one broadcasting device from the second set of broadcasting devices with at least a portion of the quantity of the information received by the at least one smart communication device from the first set of communication devices and the quantity of information relayed to the at least one smart communication device from the second set of smart communication devices;
   wherein the second set of broadcasting devices is intermittently connected with the server due to the intermittent network connectivity.

2. The method of claim 1, wherein the quantity of information further comprises at least one of: text, audio, video, multimedia, and application software.

3. The method of claim 1, wherein the first set of broadcasting devices is communicatively coupled with the server.

4. The method of claim 1, wherein the server periodically updates the quantity of information to be published by the first and the second set of broadcasting devices.

5. The method of claim 1, wherein, before synchronization of the quantity of information, the at least one smart communication device of the first set of smart communication devices verifies whether a quantity of existing information of the quantity of information stored on the at least one broadcasting device of the first set of broadcasting devices is synchronized.

6. The method of claim 1, wherein the at least one authentication technique and authorization technique comprises at least one of: a secret passphrase, a PIN, a password, and a challenge-response.

7. The method of claim 1, wherein the at least one cryptographic technique comprises at least one of: public-key cryptography, transparent encryption, and symmetric encryption.

8. A system for dynamically synchronizing information to be published on a plurality of broadcasting devices with the information stored on a server in an intermittent network connectivity, the system comprising:
   at least one pluggable device in at least one of the plurality of broadcasting devices, the at least one pluggable device comprising:
   a first processor; and
   a first memory coupled with the first processor, the first memory comprising a plurality of modules, wherein the plurality of modules comprises:
   a detection module configured to detect a presence of at least one smart communication device within a vicinity of the at least on pluggable device;
   a transceiver module configured to establish a handshake communication channel with the at least one smart communication device;
   an authorization module configured to authorize the at least one smart communication device and secure the handshake communication channel;
   a database module configured to store a quantity of information received from at least one of: the at least one smart communication device and the server; and
   a congestion control module configured to control congestion traffic due to instantaneous information exchange with a plurality of smart communication devices; and the at least one smart communication device further comprising:
   a second processor; and
   a second memory coupled with the second processor, the second memory comprising a plurality of modules, wherein the plurality of modules comprise:
   a display module configured to display the information to be published by the plurality of broadcasting devices;
   a database module configured to store the quantity information received from the plurality of broadcasting devices;
   an authorization module for authorizing at least one additional smart communication device from at least one of a first and a second set of smart communication devices;
   a transceiver module adapted to transmit and receive the quantity of information to and from the plurality of broadcasting devices and the at least one additional smart communication device; and
   a synchronization module configured to synchronize the quantity of information to be published on the plurality of broadcasting devices;
   wherein the server is intermittently connected with the plurality of broadcasting devices through a communication network.

9. The system of claim 8, wherein the at least one of the plurality of broadcasting devices further comprises at least one of: a static advertising medium, a dynamic advertising medium, a television receiver, an Out-of-home (OOH) advertising platform, a signage, and a business establishment unit display.

10. The system of claim 8, wherein the at least one smart communication devices further comprises at least one of: a smart mobile phone, a personal digital assistant (PDA), a Head-up display (HUD) unit, an in-car infotainment system, a computerized glass system.

11. The system of claim 8, wherein the plurality of broadcasting devices draw power from a non-conventional source of energy, wherein the non-conventional source of energy includes at least one of: solar, wind, tidal, geo-thermal, and biomass.

12. The system of claim 8, wherein the at least one pluggable device draws power from a non-conventional source of energy, wherein the non-conventional source of energy includes at least one of: solar, wind, tidal, geo-thermal, and biomass.

13. The system of claim 8, wherein the at least one pluggable device is augmented with sensors to sense an environmental condition, wherein the environmental condition includes at least one of temperature, humidity, wind speed, rainfall, day-night durations, seismograph, atmospheric pressure, and magnetometer.

14. The system of claim 8, wherein the authorization module implements at least one an authentication technique and an authorization technique, wherein the at least one authentication technique and authorization technique further comprises at least one of: a secret passphrase, a PIN, a password, and a challenge-response.

15. The system of claim 8, wherein the authorization module implements at least one cryptographic technique, wherein the cryptographic technique further comprises at least one of: public-key cryptography, transparent encryption, and symmetric encryption.

16. The system of claim 8, wherein the handshake communication channel further comprises at least one of: a Wi-Fi Direct communication system, a Bluetooth communication system, and a Wi-Fi communication system.

17. A method for synchronizing a plurality of broadcasting devices with a smart communication device during intermittent network connectivity between the plurality of broadcasting devices and a server, the method comprising:
   detecting at least one smart communication device located within a vicinity of a first broadcasting device of the plurality of broadcasting devices;
   establishing a first handshake communication channel between a processor of the at least one smart communication device and a processor of the first broadcasting device, wherein the first handshake communication channel is established using at least one of an authentication technique, an authorization technique, and a cryptographic technique;
   receiving, on the at least one smart communication device, a quantity of information from the first broadcasting device through the first handshake communication channel;
   terminating the first handshake communication channel when the at least one smart communication device is located beyond a vicinity of the first broadcasting device, wherein the quantity of information from the first broadcasting device is stored on a memory of the at least one smart communication device;
   detecting the at least one smart communication device located within a vicinity of a second broadcasting device of the plurality of broadcasting devices;
   establishing a second handshake communication channel between the at least one smart communication device and the second broadcasting device, wherein the second handshake communication channel is established using at least one of the authentication technique, the authorization technique, and the cryptographic technique; and
   synchronizing at least a portion of the quantity of information received from the first broadcasting device with the second broadcasting device through the second handshake communication channel, wherein the quantity of information is stored in the memory of the at least one smart communication device;
   further comprising the step of publishing the quantity of information on the second broadcasting device, wherein the second broadcasting device is intermittently connected with the server.

\* \* \* \* \*